US012614689B2

(12) United States Patent　　　(10) Patent No.:　US 12,614,689 B2

Lacoste et al.　　　　　　　　　　(45) Date of Patent:　　Apr. 28, 2026

(54) ELECTRICAL CONTACTOR SUITABLE FOR HIGH-POWER ELECTRICAL CIRCUITS, AND AIRCRAFT COMPRISING AN ELECTRICAL CIRCUIT INTEGRATING AT LEAST ONE SUCH ELECTRICAL CONTACTOR

(71) Applicant: Airbus Operations SAS, Toulouse (FR)

(72) Inventors: Jean-Marc Lacoste, Toulouse (FR); Vincent Duflos De Saint Amand, Toulouse (FR); Edwin Calderon Mendoza, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 278 days.

(21) Appl. No.: 18/586,733

(22) Filed: Feb. 26, 2024

(65) Prior Publication Data

US 2024/0290563 A1　　Aug. 29, 2024

(30) Foreign Application Priority Data

Feb. 28, 2023　　(FR) ...................................... 2301810

(51) Int. Cl.
　　　*H01H 50/64*　　　　(2006.01)
　　　*H01H 50/04*　　　　(2006.01)
(52) U.S. Cl.
　　　CPC ........ *H01H 50/641* (2013.01); *H01H 50/045* (2013.01); *B64D 2221/00* (2013.01)
(58) Field of Classification Search
　　　CPC ........ B64D 2221/00; H01H 1/20; H01H 9/30; H01H 9/542; H01H 47/02;

(Continued)

(56) References Cited

U.S. PATENT DOCUMENTS 3,504,233 A　*　3/1970　Hurtle ..................... H01H 9/542
　　　　　　　　　　　　　　　　　361/13
4,920,448 A　*　4/1990　Bonhomme ........... H01H 9/542
　　　　　　　　　　　　　　　　　361/13

(Continued)

FOREIGN PATENT DOCUMENTS

CN　　　103887122 A　*　6/2014　............... H01H 1/20
CN　　　106026059 A　*　10/2016　............... H02H 9/02

(Continued)

OTHER PUBLICATIONS

Machine translation of He et al. Chinese Patent Document CN 106026059 A Oct. 2016 (Year: 2016).*

(Continued)

*Primary Examiner* — Kevin J Comber
(74) *Attorney, Agent, or Firm* — Greer Burns & Crain Ltd.

(57)　　　　　　ABSTRACT

An electrical contactor comprising at least one couple of contacts that are spaced apart from one another when the electrical contactor is in the open state and are in contact with one another when the electrical contactor is in the closed state, and at least one system for extinguishing electrical arcs that comprises at least one switch that connects the contacts of a given couple of contacts and is configured to occupy an on state, in which the switch allows an electric current to pass between the contacts of the couple of contacts in at least one direction, and an off state, in which the switch prevents an electric current from passing between the contacts of the couple of contacts, and a control configured to control the state of the switch. Also an aircraft comprising at least one such electrical contactor.

10 Claims, 3 Drawing Sheets

(58) Field of Classification Search
CPC ......... H01H 2009/545; H01H 50/0045; H01H
50/54; H01H 50/541; H01H 50/546;
H01H 50/641
USPC ........................................................ 361/115
See application file for complete search history.

(56) References Cited

U.S. PATENT DOCUMENTS

| | | | | |
|---|---|---|---|---|
| 10,134,536 B2 * | 11/2018 | Henke | ...................... | H01H 9/30 |
| 2010/0254046 A1 * | 10/2010 | Liu | ........................ | H02H 3/087 |
| | | | | 361/13 |

FOREIGN PATENT DOCUMENTS

| | | |
|---|---|---|
| CN | 106026059 B | 6/2018 |
| EP | 0272349 A1 | 6/1988 |

OTHER PUBLICATIONS

Machine translation of Raymond et al. Chinese Patent Document CN 103887122 A Jun. 2014 (Year: 2014).*
French Search Report for corresponding French Patent Application No. 2301810 dated Aug. 22, 2023.
Gelder et al., "Zero Volt Switching Hybrid DC Circuit Breakers" Conference Record of the 2000 IEEE Industry Applications Conference; 35th IAS Annual Meeting and World Conference on Industrial Applications of Electrical Energy, Rome, Italy, Oct. 8-12, 2000, vol. Conf. 35, Oct. 8, 2000; 2923.

* cited by examiner

100

ELECTRICAL CONTACTOR SUITABLE FOR HIGH-POWER ELECTRICAL CIRCUITS, AND AIRCRAFT COMPRISING AN ELECTRICAL CIRCUIT INTEGRATING AT LEAST ONE SUCH ELECTRICAL CONTACTOR

CROSS-REFERENCES TO RELATED APPLICATIONS

This application claims the benefit of French Patent Application Number 2301810 filed on Feb. 28, 2023, the entire disclosure of which is incorporated herein by way of reference.

FIELD OF THE INVENTION

The present application relates to an electrical contactor designed for high-power electrical circuits and to an aircraft comprising an electrical circuit integrating at least one such electrical contactor.

BACKGROUND OF THE INVENTION

According to one embodiment shown in FIG. 1, an electrical circuit 10 comprises an electrical contactor 12 that connects a first and a second part 10.1, 10.2 of the electrical circuit 10 and is configured to occupy an open state in which the electrical contactor 12 does not allow an electric current to flow between the first and the second part 10.1, 10.2 and a closed state in which the electrical contactor 12 allows an electric current to flow between the first and the second part 10.1, 10.2.

The electrical contactor 12 comprises:

a first and a second fixed contact 14.1, 14.2 that are connected to the first and the second part 10.1, 10.2, respectively, of the electrical circuit 10, a mobile part 16 supporting a first and a second mobile contact 16.1, 16.2, the mobile part 16 being configured to occupy a first position, which corresponds to the open state of the electrical contactor 12 in which the first and the second mobile contact 16.1, 16.2 are spaced apart from the first and the second fixed contact 14.1, 14.2, respectively, and a second position, which corresponds to the closed state of the electrical contactor 12 in which the first and the second mobile contact 16.1, 16.2 are in contact with the first and the second fixed contact 14.1, 14.2, respectively, an actuator 18 configured to move the mobile part 16 from the first position to the second position, and vice versa.

The mobile part 16 comprises a body made of copper 16.3, which provides electrical continuity between the first and the second mobile contact 16.1, 16.2.

According to one embodiment, the actuator 18 is an electromagnetic actuator that comprises a coil, a plunger cooperating with the coil and a spring, the coil being configured to occupy an excited state upon receiving a signal, in which the coil causes the plunger to move in a first direction, and a second, unexcited state, in which the spring causes the plunger to move in a second direction opposite to the first direction. According to one arrangement, the first direction of movement causes the electrical contactor 12 to close.

This embodiment is suitable for low-power and medium-power electrical circuits that operate, for example, with a voltage of 230 V and a current of 100 A.

In the case of a high-power electrical circuit operating with a voltage that is greater than or equal to 1200 V and a current that is greater than or equal to 500 A, the electrical contactor as described above generates a large number of ejections of material, which significantly reduces its service life. In addition, in order to be able to operate at these power levels, an actuator designed according to the prior art has to have large dimensions, which leads to an increase in the mass and overall size thereof. The fact that such a contactor is installed in a non-pressurized zone of an aircraft flying at high altitude accentuates these problems.

SUMMARY OF THE INVENTION

The present invention aims to overcome all or some of the drawbacks of the prior art.

To this end, the invention relates to an electrical contactor comprising at least one couple of contacts that are configured to occupy a first position, which corresponds to an open state of the electrical contactor in which the contacts are spaced apart, and a second position, which corresponds to a closed state of the electrical contactor in which the contacts are in contact with one another.

According to the invention, the electrical contactor comprises at least one system for extinguishing electrical arcs that comprises at least one switch that connects the contacts of a given couple of contacts and is configured to occupy an on state, in which the switch allows an electric current to pass between the contacts of the couple of contacts in at least one direction, and an off state, in which the switch prevents an electric current from passing between the contacts of the couple of contacts, and a control configured to control the state of the switch. In addition, the electrical contactor comprises a pair of a first and a second fixed contact and at least one mobile part supporting at least one pair of a first and a second mobile contact, the mobile part comprising at least one current limiter connecting the first and the second mobile contact.

This solution makes it possible to limit the occurrence of electrical arcs and the ejection of material when the electrical contactor is used in a high-power electrical circuit, which contributes to reducing the impact of electrical arcs and ejections of material on the service life of the electrical contactor.

According to another feature, the control is configured to keep the switch in the off state in the absence of electrical arcs between the contacts connected by the switch and to switch same to the on state in the presence of electrical arcs.

According to another feature, the control is configured to cause the switch to pass from the off state to the on state when the electrical contactor passes from the closed state to the open state.

According to another feature, the switch and/or the control are configured to keep the switch in the on state for a given duration starting from the switch passing to the on state.

According to another feature, the electrical contactor comprises a pair of a first and a second fixed contact and at least one mobile part supporting at least one pair of a first and a second mobile contact, the first fixed and mobile contacts forming a first couple of contacts, the second fixed and mobile contacts forming a second couple of contacts. In addition, the switch is single-throw and, in the on state, allows an electric current to pass from the mobile contact to the fixed contact of a couple of contacts.

According to another feature, the system for extinguishing electrical arcs comprises a single switch that connects a couple of a fixed and a mobile contact out of a first couple of contacts formed by the first fixed and mobile contacts and a second couple of contacts formed by the second fixed and mobile contacts.

According to another feature, the switch is an electronic relay.

According to another feature, each current limiter is a liquid-metal current limiter.

According to another feature, the current limiter comprises a first and a second plate that are made of solid conductive material and are connected to the first and the second mobile contact, respectively, a cavity separating the first and the second plate and containing a liquid conductive material, and at least one partition that is made of electrically insulating material and that separates the cavity into a first and a second chamber, the partition comprising at least one through-opening allowing the first and the second chamber to communicate and a cross-sectional flow area that is dimensioned so as to cap a short-circuit current at a given maximum value.

The invention also relates to an aircraft comprising at least one electrical circuit comprising at least one electrical contactor according to one of the above features.

BRIEF DESCRIPTION OF THE DRAWINGS

Further features and advantages will become apparent from the following description of the invention, which description is given solely by way of example, with reference to the appended drawings, in which.

DETAILED DESCRIPTION OF THE PREFERRED EMBODIMENTS

Figure 1:
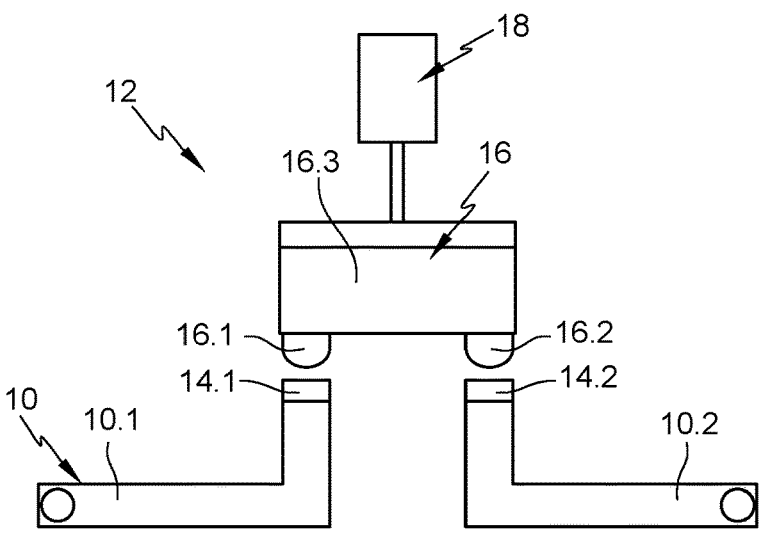
FIG. 1 is a schematic representation of an electrical contactor, illustrating an embodiment of the prior art.
Figure 2:
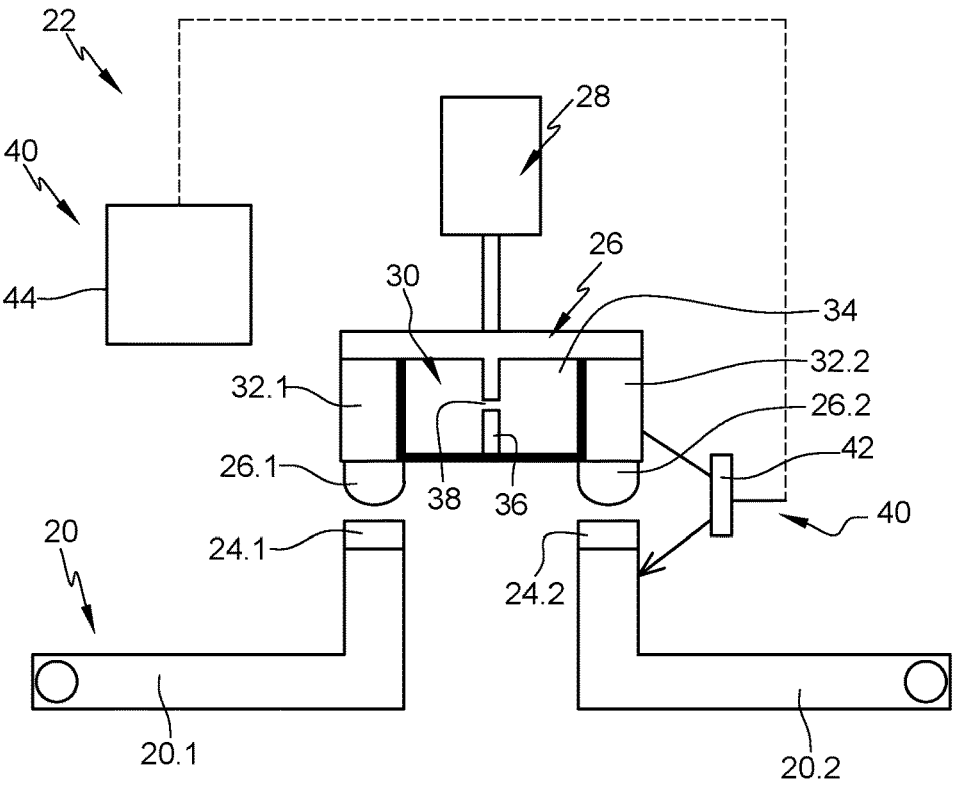
FIG. 2 is a schematic representation of an electrical contactor, illustrating an embodiment of the invention.

According to an embodiment shown in FIG. 2, an electrical circuit 20 comprises a first and a second part 20.1, 20.2 that are connected by an electrical contactor 22.

Figure 4:
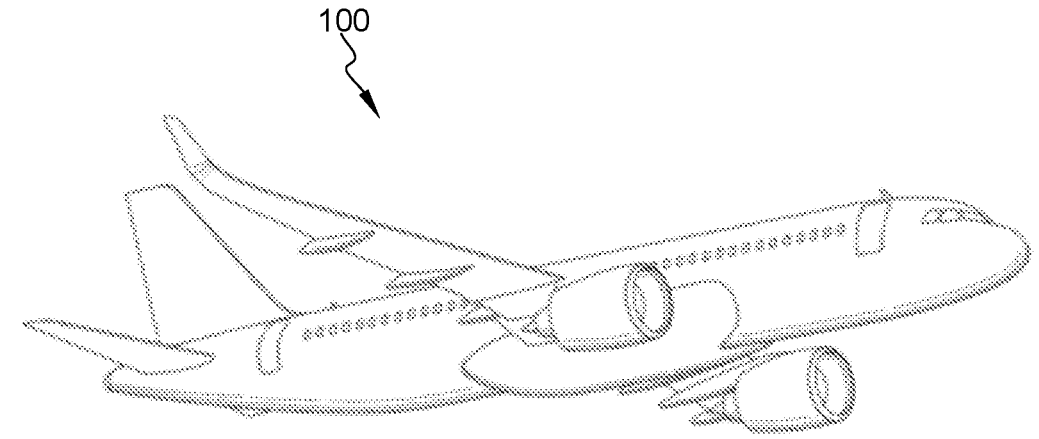

According to one application, an aircraft 100 (see, FIG. 4) comprises such an electrical circuit 20, the electrical contactor 22 being able to be located in a non-pressurized environment.

The electrical contactor 22 comprises:

at least one pair of a first and a second fixed contact 24.1, 24.2 that are connected to the first and the second part 20.1, 20.2, respectively, of the electrical circuit 20, at least one mobile part 26 supporting at least one pair of a first and a second mobile contact 26.1, 26.2, said mobile part 26 being configured to occupy a first position, which corresponds to the open state of the electrical contactor 22 in which the first and the second mobile contact 26.1, 26.2 are spaced apart from the first and the second fixed contact 24.1, 24.2, respectively, and a second position, which corresponds to the closed state of the electrical contactor 22 in which the first and the second mobile contact 26.1, 26.2 are in contact with the first and the second fixed contact 24.1, 24.2, respectively, at least one actuator 28 configured to move the mobile part 26 from the first position to the second position, and vice versa.

According to one embodiment, the actuator 28 is an electromagnetic actuator. Of course, the invention is not limited to this embodiment of the actuator 28.

According to one feature of the invention, the mobile part 26 comprises at least one current limiter 30 connecting the first and the second mobile contact 26.1, 26.2. According to one configuration, the mobile part 26 comprises one current limiter 30 for each pair of a first and a second mobile contact 26.1, 26.2.

According to one embodiment, each current limiter 30 is a liquid-metal current limiter. According to one arrangement, the current limiter 30 comprises a first and a second plate 32.1, 32.2 that are made of solid conductive material and are connected to the first and the second mobile contact 26.1, 26.2, respectively, which plates are substantially parallel and spaced apart from one another, a cavity 34 that is partially delimited by the first and the second plate 32.1, 32.2 and contains a liquid conductive material, and at least one partition 36 that is made of electrically insulating material and that separates the cavity 34 into a first and a second chamber. According to one arrangement, the partition 36 is substantially parallel to the first and the second plate 32.1, 32.2 and is positioned substantially equidistantly from the first and the second plate 32.1, 32.2.

The first and the second plate 32.1, 32.2 each comprise a zone of contact with the liquid conductive material having a given surface area.

The partition 36 comprises at least one through-opening 38 that allows the first and the second chamber to communicate, which through-opening has a cross-sectional flow area that is considerably smaller than the given surface area of the first and the second plate 32.1, 32.2 in contact with the liquid conductive material.

According to one configuration, the partition 36 may comprise a plurality of through-openings 38. According to this configuration, the sum of the cross-sectional flow areas of the through-openings 38 is considerably smaller than the given surface area of the first and the second plate 32.1, 32.2 in contact with the liquid conductive material.

"Considerably smaller" is understood to mean that the cross-sectional flow area of the through-opening (or of the through-openings) is smaller than at least 10 times the given surface area of the first and the second plate 32.1, 32.2 in contact with the liquid conductive material.

Regardless of the configuration, the cross-sectional flow area of the partition 36, which corresponds to the sum of the cross-sectional flow areas of the through-openings 38, is dimensioned so as to allow a current having a value lower than a given maximum value to pass through the partition 36 via the through-opening (or through-openings) 38 and to cap a short-circuit current at the given maximum value.

By way of example, the liquid conductive material is a eutectic metal sold under the name Galinstan.

Of course, the invention is not limited to this current limiter 30.

According to another feature, the electrical contactor 22 comprises at least one system 40 for extinguishing electrical arcs that comprises at least one switch 42 that connects a couple of contacts out of a first couple of contacts formed by the first fixed and mobile contacts 24.1, 26.1 and a second couple of contacts formed by the second fixed and mobile contacts 24.2, 26.2, and is configured to occupy an on state, in which the switch 42 allows an electric current to pass between the fixed and the mobile contact 24.1, 26.1; 24.2, 26.2 of the couple of contacts in at least one direction, and an off state, in which the switch 42 prevents an electric current from passing between the fixed and the mobile contact 24.1, 26.1; 24.2, 26.2 of the couple of contacts, and a control 44, e.g., a controller, configured to control the state of the switch 42.

According to one mode of operation, the switch 42 is in the off state when the electrical contactor 22 is in the closed state and is switched to the on state only upon the electrical contactor 22 being opened.

The control 44 is configured to keep the switch 42 in the off state in the absence of electrical arcs between the fixed and mobile contacts 24.1, 26.1 (or 24.2, 26.2) connected by the switch 42 and to switch same to the on state in the presence of electrical arcs.

According to a first configuration, the system 40 for extinguishing electrical arcs comprises a sensor configured to detect an electrical arc between the fixed and the mobile contact 24.1, 26.1 (or 24.2, 26.2) that are connected by the switch 42 and to transmit a signal to the control 44 when an electrical arc occurs.

According to one set-up, the switch 42 and/or the control 44 are configured to keep the switch 42 in the on state for a given duration starting from the switch 42 passing to the on state.

According to a second configuration, the control 44 is configured to cause the switch 42 to pass from the off state to the on state when the electrical contactor 22 passes from the closed state to the open state and remain in the on state for a given duration starting from said switch passing to the on state.

According to one embodiment, the switch 42 is an electronic relay.

According to one arrangement, the switch 42 is single-throw and, in the on state, allows an electric current to pass from the mobile contact 26.1, 26.2 to the fixed contact 24.1, 24.2 of a couple of contacts.

According to one embodiment, the system 40 for extinguishing electrical arcs comprises a single switch 42 that connects a single couple of a fixed and a mobile contact 24.1, 26.1; 24.2, 26.2. This solution makes it possible to guarantee galvanic isolation between the first and the second part 20.1, 20.2 of the electrical circuit insofar as only a couple of a fixed and a mobile contact is connected by the switch 42.

The mode of operation of the electrical contactor 22 is described with regard to FIG. 3.

Figure 3A:
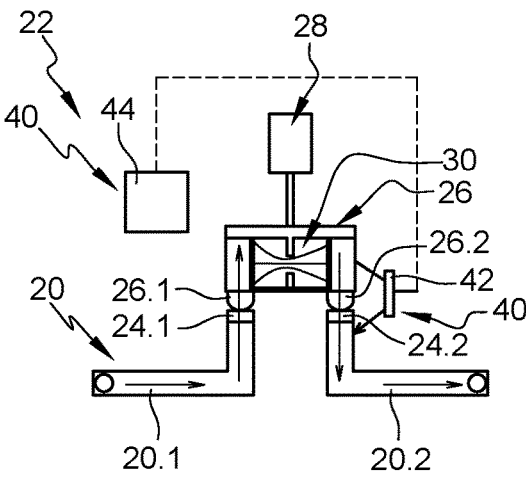
FIG. 3A shows various a schematic representation of the electrical contactor shown in FIG. 2 in a closed state.

In the closed state, as illustrated in FIG. 3A, the first and the second fixed contact 24.1, 24.2 are in contact with the first and the second mobile contact 26.1, 26.2. The current limiter 30 does not interfere with the current passing through the mobile part 26. The switch 42 is in the off state.

Figure 3B:
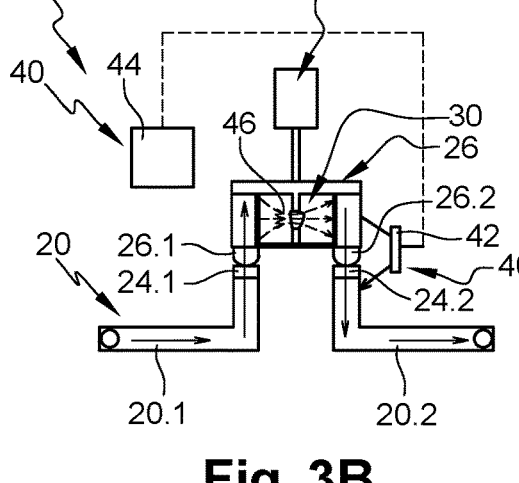
FIG. 3B shows various a schematic representation of the electrical contactor shown in FIG. 2 in a short-circuit state.

In the presence of a short-circuit current 46, as illustrated in FIG. 3B, the current limiter 30 caps the short-circuit current at the given maximum value in such a way that, if the short-circuit current 46 propagates from the first part 20.1 to the second part 202.2 of the electrical circuit 20, the second part 20.2 is protected from the short-circuit current 46 by the current limiter 30. The switch 42 is in the off state.

Figure 3C:
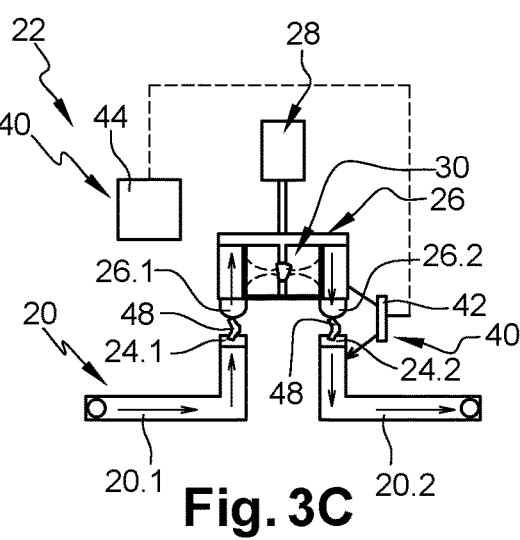
FIG. 3C shows various a schematic representation of the electrical contactor shown in FIG. 2 in an open state.

When the electrical contactor 22 opens, as illustrated in FIG. 3C, electrical arcs 48 occur between the fixed and the mobile contact 24.1, 26.1; 24.2, 26.2 of each couple of contacts and a short-circuit current appears between the first and the second mobile contact 26.1, 26.2. As above, the current limiter 30 limits the current passing between the first and the second mobile contact 26.1, 26.2.

Figure 3D:
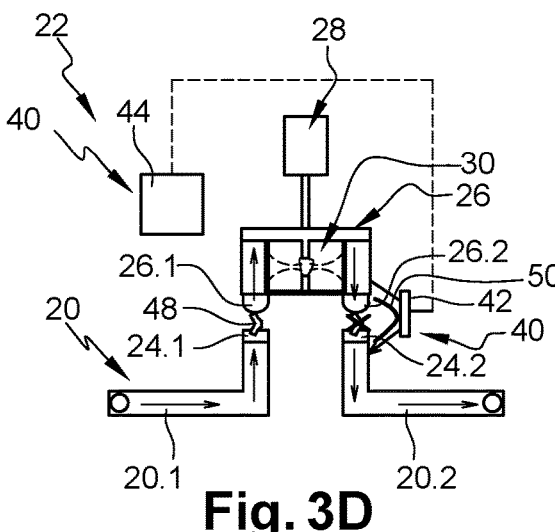
FIG. 3D shows various a schematic representation of the electrical contactor shown in FIG. 2 with a switch passing from off to on, FIG. 3E shows various a schematic representation of the electrical contactor shown in FIG. 2 with extinguishing electrical arcs, and, FIG. 3F shows various a schematic representation of the electrical contactor shown in FIG. 2 in an open and off state, and, FIG. 4 shows an aircraft that may be used in accordance with the present invention.

As illustrated in FIG. 3D, the control 44 causes the switch 42 to pass from the off state to the on state. In this state, the switch 42 generates an electrical path 50 that connects the fixed and the mobile contact 24.1, 26.1; 24.2, 26.2 and causes the electrical arcs 48 between said fixed and mobile contacts 24.2, 26.2, which are connected by the switch 42, to be extinguished.

Figure 3E:
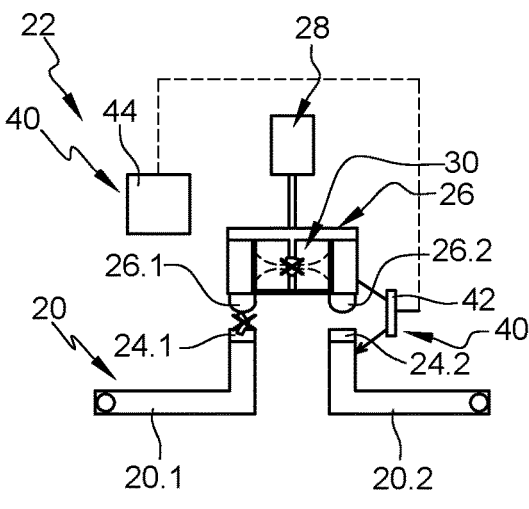

As illustrated in FIG. 3E, extinguishing electrical arcs at a first couple of a fixed and a mobile contact 24.2, 26.2 automatically causes electrical arcs 48 between the fixed and the mobile contact 24.1, 26.1 of the other couple of contacts to be extinguished.

Figure 3F:
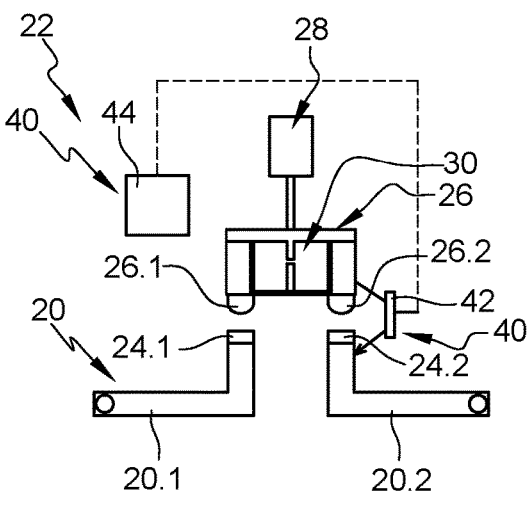

As illustrated in FIG. 3F, the electrical contactor 22 is in the open state and the switch 42 is again in the off state.

The presence of the system 40 for extinguishing electrical arcs makes it possible to limit the occurrence of electrical arcs and ejection of material, and to therefore reduce the impact of these electrical arcs on the service life of the electrical contactor 22 even if the electrical contactor is positioned in a non-pressurized zone of an aircraft.

Due to the reduction in ejection of material when the electrical contactor is opened, it is not necessary to oversize said electrical contactor, which makes it possible to maintain a limited volume and mass.

Of course, the invention is not limited to this embodiment. According to another embodiment, the electrical contactor comprises a single couple of a fixed and a mobile contact that are configured to occupy a first position, which corresponds to the open state of the electrical contactor 22 in which the fixed and the mobile contact 24.1, 26.1 are spaced apart, and a second position, which corresponds to the closed state of the electrical contactor 22 in which the fixed and the mobile contact 24.1, 26.1 are in contact with one another. According to this embodiment, the mobile part 26 supports a single mobile contact 26.1.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electrical contactor, comprising:
at least one couple of contacts that are configured to occupy a first position, which corresponds to an open state of the electrical contactor in which the contacts are spaced apart, and a second position, which corresponds to a closed state of the electrical contactor in which the contacts are in contact with one another,
at least one system for extinguishing electrical arcs comprising
at least one switch that connects the contacts of a given couple of contacts and is configured to occupy an on state, in which the at least one switch allows an electric current to pass between the contacts of the couple of contacts in at least one direction, and an off state, in which the at least one switch prevents an electric current from passing between the contacts of the couple of contacts, and
a control configured to control the state of the at least one switch, and,
a pair of a first and a second fixed contact and at least one mobile part supporting at least one pair of a first and a second mobile contact, and wherein the at least one mobile part comprises at least one current limiter connecting the first and the second mobile contact.

2. The electrical contactor as claimed in claim 1, wherein the control is configured to keep the at least one switch in the off state in an absence of electrical arcs between the contacts connected by the at least one switch and to switch same to the on state in a presence of electrical arcs.

3. The electrical contactor as claimed in claim 1, wherein the control is configured to cause the at least one switch to pass from the off state to the on state when the electrical contactor passes from the closed state to the open state.

4. The electrical contactor as claimed in claim 1, wherein the at least one switch, the control, or both are configured to keep the at least one switch in the on state for a given duration starting from the at least one switch passing to the on state.

5. The electrical contactor as claimed in claim 1, wherein the electrical contactor comprises a pair of a first and a second fixed contact and at least one mobile part supporting at least one pair of a first and a second mobile contact, the first fixed and mobile contacts forming a first couple of contacts, the second fixed and mobile contacts forming a second couple of contacts, and wherein the at least one switch is single-throw and, in the on state, allows an electric current to pass from the mobile contact to the fixed contact of a couple of contacts.

6. The electrical contactor as claimed in claim 1, wherein the electrical contactor comprises a pair of a first and a second fixed contact and at least one mobile part supporting at least one pair of a first and a second mobile contacts, and wherein the system for extinguishing electrical arcs comprises a single switch that connects a couple of a fixed and a mobile contact out of a first couple of contacts formed by the first fixed and mobile contacts and a second couple of contacts formed by the second fixed and mobile contacts.

7. The electrical contactor as claimed in claim 1, wherein the at least one switch is an electronic relay.

8. The electrical contactor as claimed in claim 1, wherein each current limiter is a liquid-metal current limiter.

9. The electrical contactor as claimed in claim 8, wherein the current limiter comprises a first and a second plate that are made of solid conductive material and are connected to the first and the second mobile contact, respectively, a cavity separating the first and the second plate and containing a liquid conductive material, and at least one partition that is made of electrically insulating material and that separates the cavity into a first and a second chamber, the partition comprising at least one through-opening allowing the first and the second chamber to communicate and a cross-sectional flow area that is dimensioned so as to cap a short-circuit current at a given maximum value.

10. An aircraft comprising:

at least one electrical circuit comprising the electrical contactor as claimed in claim 1.

* * * * *